(12) United States Patent
Goodman

(10) Patent No.: US 7,921,161 B2
(45) Date of Patent: *Apr. 5, 2011

(54) ROUTING T-37 E-MAIL OVER AN H 323 (VOIP) NETWORK

(75) Inventor: Lee N. Goodman, Lowell, MA (US)

(73) Assignees: Verizon Corporate Services Group Inc., Basking Ridge, NJ (US); Level 3 Communications, LLC, Broomfield, CO (US); Raytheon BBN Technologies Corp., Cambridge, MA (US)

( * ) Notice: Subject to any disclaimer, the term of this patent is extended or adjusted under 35 U.S.C. 154(b) by 1652 days.

This patent is subject to a terminal disclaimer.

(21) Appl. No.: 10/748,859

(22) Filed: Dec. 29, 2003

(65) Prior Publication Data

US 2005/0086312 A1    Apr. 21, 2005

Related U.S. Application Data

(62) Division of application No. 09/638,166, filed on Aug. 10, 2000, now Pat. No. 6,735,617.

(51) Int. Cl.
    *G06F 13/00* (2006.01)
(52) U.S. Cl. ........................ 709/206; 709/245; 379/93.24
(58) Field of Classification Search ................. 709/206, 709/245; 379/93.24; 358/402
    See application file for complete search history.

(56) References Cited

U.S. PATENT DOCUMENTS

| | | | |
|---|---|---|---|
| 5,974,449 A | 10/1999 | Chang et al. | |
| 6,020,980 A | 2/2000 | Freeman | |
| 6,025,931 A | 2/2000 | Bloomfield | |
| 6,094,277 A | 7/2000 | Toyoda | |
| 6,282,193 B1 | 8/2001 | Hluchyj et al. | |
| 6,347,085 B2 * | 2/2002 | Kelly | 370/352 |
| 6,363,065 B1 | 3/2002 | Thornton et al. | |
| 6,452,915 B1 | 9/2002 | Jorgensen | |
| 6,463,053 B1 | 10/2002 | Chen | |
| 6,542,472 B1 | 4/2003 | Onuma | |
| 6,594,254 B1 * | 7/2003 | Kelly | 370/352 |
| 6,600,735 B1 * | 7/2003 | Iwama et al. | 370/352 |
| 6,625,258 B1 | 9/2003 | Ram et al. | |
| 6,625,642 B1 | 9/2003 | Naylor et al. | |
| 6,735,617 B1 * | 5/2004 | Goodman | 709/206 |
| 6,965,591 B1 * | 11/2005 | Roy | 370/352 |
| 7,272,134 B2 * | 9/2007 | Iwama et al. | 370/352 |
| 2001/0055299 A1 * | 12/2001 | Kelly | 370/352 |
| 2003/0235187 A1 * | 12/2003 | Iwama et al. | 370/352 |

OTHER PUBLICATIONS

Masinter & Wing, Extended Facsimile Using Internet Mail, Mar. 1999, pp. 1-12.

K. Toyoda, et al., A Simple Mode of Facsimile Using Internet Mail, Mar. 1998, pp. 1-13.

International Telecommunication Union Study Group, Implementor's Guide for ITU-T Recommendations, Mar. 2000, pp. 1-96.

(Continued)

*Primary Examiner* — Kenneth R Coulter

(57) ABSTRACT

Disclosed are methods and systems for routing T-37 E-mail over an H 323 (VOIP) network. The methods and systems facilitate the obtaining and utilization of data from Gatekeepers with respect to the utilization of Gateways to be utilized to transmit the E-mail from the network over a conventional telephone network to the recipient. They thereby facilitate the choice of a Gateway which is less heavily utilized.

22 Claims, 14 Drawing Sheets

| Gateway Domain Name | Gateway Address | Gateway Priority |
|---|---|---|
| 213.Sigma.net | LA 1.Sigma.net | 80 |
| 213.Sigma.net | LA 2.Sigma.net | 90 |
| 213.Sigma.net | LA 3.Sigma.net | 10 |
| 213.Sigma.net | LA 4.Sigma.net | 30 |
| 617.Sigma.net | Boston 1.Sigma.net | 100 |
| 617.Sigma.net | Boston 2.Sigma.net | 90 |
| 617.Sigma.net | Boston 3.Sigma.net | 10 |
| 617.Sigma.net | Boston 4.Sigma.net | 60 |
| 919.Sigma.net | Dallas 1.Sigma.net | 80 |
| 919.Sigma.net | Dallas 2.Sigma.net | 20 |
| 919.Sigma.net | Dallas 3.Sigma.net | 50 |
| 919.Sigma.net | Dallas 4.Sigma.net | 75 |

OTHER PUBLICATIONS

International Telecommunication Union Study Group 16—Report R 54, Part II.B (Implementor's Guides) of the Report of WP 2/16 (Services and High Rate Systems), Jul. 1999, pp. 1-99.

International Telecommunication Union Study Group 16—Contribution Recommendation H. 245—Version 3, Jan. 1998, pp. i-247.

International Telecommunication Union Study Group 16—Contribution 54 Proposed Revision of Recommendation H.323—Packet-Based Multimedia Communications Systems, Oct. 1997.

International Telecommunication Union, H.225.0, Version 2 Line Transmission of Non-Telephone Signals, Mar. 25, 1997, pp. 1-146.

* cited by examiner

| Zone | Gateway Address | Gateway Utilization Priority Score |
|---|---|---|
| 617 | a1.b1.c1.d1 | 100 |
| 617 | a2.b2.c2.d2 | 90 |
| 617 | a3.b3.c3.d3 | 10 |
| 617 | a4.b4.c4.d4 | 60 |
| 919 | i1.j1.k1.l1 | 80 |
| 919 | i2.j2.k2.l2 | 20 |
| 919 | i3.j3.k3.l3 | 50 |
| 919 | i4.j4.k4.l4 | 75 |
| 213 | e1.f1.g1.h1 | 80 |
| 213 | e2.f2.g2.h2 | 90 |
| 213 | e3.f3.g3.h3 | 10 |
| 213 | e4.f4.g4.h4 | 30 |

Prior Art

| Zone/Area Code | Gateway Domain Name |
|---|---|
| 617 | 617.Sigma.net |
| 919 | 919.Sigma.net |
| 213 | 213.Sigma.net |

Figure 11

| Zone | Gateway Address | Gateway Priority |
| --- | --- | --- |
| 213 | GW LA 1 | 80 |
| 213 | GW LA 2 | 90 |
| 213 | GW LA 3 | 10 |
| 213 | GW LA 4 | 30 |
| | | |
| 617 | GW Boston 1 | 100 |
| 617 | GW Boston 2 | 90 |
| 617 | GW Boston 3 | 10 |
| 617 | GW Boston 4 | 60 |
| | | |
| 919 | GW Dallas 1 | 80 |
| 919 | GW Dallas 2 | 20 |
| 919 | GW Dallas 3 | 50 |
| 919 | GW Dallas 4 | 75 |

Figure 13

ROUTING T-37 E-MAIL OVER AN H 323 (VOIP) NETWORK

CLAIM OF PRIORITY

This application is a divisional application of U.S. Ser. No. 09/638,166 filed on Aug. 10, 2000, now allowed as U.S. Pat. No. 6,735,617, the contents of which are herein incorporated by reference in their entirety.

TECHNICAL FIELD

This invention relates to transmission of facsimile copies of documents over the Internet.

BACKGROUND OF THE INVENTION

Computer networks, and the Internet in particular, have become increasingly important for the storage, retrieval and communication of documents and other material. Among other things, the Internet may permit the inexpensive transmittal of large quantities of data, between locations that may be thousands of miles apart, in a very short period of time.

The availability of the Internet as an inexpensive and rapid tool for transmitting large quantities of data has led to interest in its adaptation to the communication of varieties of data that traditionally have been sent over other networks. Thus, for example, there is interest in using the Internet to transmit telephone conversations in lieu of the use of conventional telephone lines, or to transmit other communications that in the past may have utilized telephone lines, such as facsimile transmissions.

In using the Internet to transmit telephone conversations or facsimile transmissions, it may be desirable to use the Internet only for a portion of the communication, such as the "long distance" or middle portion of the communication, while the user who has initiated the communication, and/or the recipient of the communication, use their telephone (or facsimile machine) and their telephone line, rather than an Internet connection, to actually send or receive the transmission.

In order to permit this combination of telephone and Internet in communications, a number of protocols have been developed. Thus, for example, an H 323 protocol may be used to permit the transmission of voice over the Internet Protocol ("IP") network. The result is referred to as the Voice Over IP ("VOIP") or H 323 network. Insofar as a facsimile transmission conventionally may be made between two telephones, such a transmission may be sent using the VOIP network and the associated H 323 protocol.

However, a T 37 protocol also may be used to permit the transmission of facsimiles over the IP network.

The system of transmitting a facsimile over the IP network using the T 37 protocol proceeds by treating the facsimile as a TIF image, and sending it over the IP network as if it were an attachment to an E-mail message. To deliver the facsimile over a telephone line (or a wireless or other telephone connection) to a recipient, it may be converted to a facsimile image suitable for telephone transmission. The use of the T 37 protocol, for example, may permit a sender to originate a facsimile transmission directly from his computer, without the use of a facsimile machine, and thus without the use of a conventional telephone line connection.

Presently, a VOIP network under the H 323 protocol may utilize Gateways and Gatekeepers to manage the interaction between the telephone and IP systems. Thus, referring to FIG. 1, a process 10 to make a VOIP telephone call may begin with a caller 20 utilizing a conventional telephone to connect over a conventional telephone network 30 into an Inbound Gateway. (It will be understood by those of ordinary skill in the art that in place of using a conventional telephone and connecting over a conventional land-line telephone network, the call may begin through the use of a cellular or other telephone connecting over a wireless network. Hereafter, references to conventional telephone networks will be understood to encompass cellular or other wireless systems, and references to conventional telephones will be understood to refer to other types of telephones such as cellular telephones.)

The Inbound Gateway 40 is an entrance point to the IP network 50. In connecting into the Gateway the caller may provide a telephone number to which it is desired to place the telephone call. The Inbound Gateway 40 in turn may make an inquiry 60 to a Gatekeeper 70, which maintains a lookup table relating telephone numbers to Gateways.

Depending upon a variety of factors, the lookup table may maintain Gateway addresses, and may be searched, for the specific telephone number being called, for the area code/local exchange of the number being called, or for the area code alone. A given telephone number, area code/exchange combination, or area code, may be associated with more than one Gateway. The look up table (which may be referred to as an H 323 Zone table) may maintain data about Gateway utilization, in order to facilitate the choice of a Gateway with a lowest utilization in a given Zone. In any event, however, an object of the lookup may be to find a Gateway close to the recipient, so that the telephone call may be routed over the Internet to that Gateway, and returned to the conventional telephone network, at a location close to the recipient such that telephone network charges for the telephone call are minimized.

FIG. 2 illustrates a Gatekeeper lookup table 210 which may be used with the Gatekeeper 70 in FIG. 1 to maintain data by Zone 220, maintain Gateway addresses 230 for each Zone, and maintain data with respect to Gateway utilization 240.

Returning to FIG. 1, once a most appropriate Outbound Gateway 90 near the recipient is selected, from among a set of possible Gateways 80, 90, 100, the telephone call may be completed by establishing a telephone link over a conventional telephone network 110 between the Outbound Gateway 90 selected and the recipient 120. The telephone call then may be transmitted: (1) as a conventional telephone call over the conventional telephone network 30 between the caller 20 and the first (Inbound) Gateway 40; (2) as packets over the IP network 50 between the first (Inbound) Gateway 40 and the second (Outbound) Gateway 90; and (3) as a conventional telephone call over the conventional telephone network 110 between the second (Outbound) Gateway 90 and the recipient 120.

In this process, the Gateways 40, 90 may be thought of as knowing the Internet Protocol (IP) and in effect merging the conventional telephone network 30, 110 with the Internet 50, while the Gatekeeper 70 keeps track of relationships between IP addresses and telephone numbers and in effect translates between the two.

Conceptually, this may be illustrated by means of a simple example as illustrated in FIG. 3, for which a lookup table 410 is illustrated in FIG. 4.

Referring to FIG. 4, the example comprises a world composed of two zones, Boston and Los Angeles, in which each zone is defined by one area code 420, and each zone or area code has only one Gateway 430.

Referring now to FIG. 3, when it is desired to place a VOIP telephone call from Boston to Los Angeles, a process 310 might begin with a telephone call being initiated by a Boston caller 320. This call could be to a telephone number which connected the caller to a Boston Gateway 330. That Gateway then could send an inquiry to a Gatekeeper 340. The Gatekeeper then could look in a two-row H 323 Zone Table as illustrated in FIG. 4 containing zone "617" and an associated IP address (in this example, "a.b.c.d") for the Boston Gateway in one row, and zone "213" and an associated IP address (in this example, "e.f.g.h") for a Los Angeles Gateway in the second row. Returning now to FIG. 3, the "213" row could be chosen 350. The Gatekeeper then could communicate the IP address e.f.g.h of the Los Angeles Gateway to the Boston Gateway 360. Information about the telephone call could be sent in the form of packets from the Boston Gateway over the Internet to the IP address of the Los Angeles Gateway 370. Finally the telephone call could be completed over a conventional telephone network between the Los Angeles Gateway and a telephone belonging to a recipient of the telephone call 380, and the two persons could talk 390, with the telephone call proceeding as illustrated in FIG. 1 over the conventional telephone network 30 between the caller 20 and the Boston Gateway 40, as packets over the IP network 50 between the Boston Gateway 40 and the Los Angeles Gateway 90, and over the conventional telephone network 110 between the Los Angeles Gateway 90 and the recipient 120. Transmission of the telephone call as packets over the IP network 50 between the Boston and Los Angeles Gateways 40, 90 could eliminate use of a long distance telephone network, and costs associated with that network.

A slightly more complicated process could take place in a VOIP network containing three Zones, in which each Zone had associated with it several Gateways with varying utilizations. According to this example, for which a lookup table 510 is illustrated in FIG. 5, when a telephone call destined for an area code "213" reaches an incoming Gateway, that Gateway could query a Gatekeeper which looked in an H 323 Zone Table 510 for Zone 213 and determined that a Gateway with an IP address "e3.f3.g3.h3" has a lowest utilization. The incoming Gateway then could forward the telephone call to that Zone 213 Gateway to be returned to a conventional telephone network.

Presently, as illustrated in FIG. 6, a process 610 for transmission of electronic mail ("E-mail") over the IP network 650 may proceed in a manner which in some respects parallels the above. The transmission may utilize mail servers and domain name servers ("DNS servers"). When a computer user sends an E-mail from his computer 620, the user may address it to "recipient@recipientserver.xxx". Packets may be transmitted from the user's computer over his connection 630 to a mail server 640 with which he or she is associated. (Connection may be over a conventional telephone network utilizing a modem or over a high speed connection.)

The user's mail server 640 then may make an inquiry 645 of a DNS server 660 which maintains a lookup table associating domain names with IP addresses.

FIG. 7 illustrates such a lookup table 710, for a situation where there are three mail servers. The lookup table may associate domain names 720 with mail server IP addresses 730. A domain name of a recipient's mail server, in the example of FIG. 6 "recipientserver.xxx", may be looked up, and an associated IP address for that mail server may be identified.

In looking up an IP address, the DNS server may take advantage of the fact that it maintains special records designating which IP addresses in its data base are mail servers. These records are "MX" records; this differentiation between mail server addresses and other addresses is necessary so that E-mail addressed to "recipient@recipientserver.xxx" may be sent to a "recipientserver.xxx" mail server, not to a Web page named "recipientserver.xxx".

The DNS server's function of finding an IP address for a mail server with a given domain name is analogous to a Gatekeeper's function of finding an IP address for a Gateway associated with a telephone number in a given Zone in the VOIP system. As with a Gatekeeper H 323 Zone Table, a DNS server lookup table may include several different IP addresses for a given mail server domain name, along with information about utilization of each such IP address, to facilitate a most appropriate choice of an IP address.

An illustration of such a lookup table 810 is given in FIG. 8, which illustrates a situation where each mail server domain name 820 has associated with it several IP addresses 830, and a DNS server maintains information about server IP address utilization 840, to facilitate a choice of a most appropriate server.

Returning to FIG. 6, after an IP address of an appropriate mail server for the recipient is selected from the lookup table, the sender's mail server 640 then may forward the E-mail over the IP network 650 to the mail server 670 which was selected from a set of potential mail servers 670, 672, 674. The mail server 670 to which the E-mail is forwarded then may store the E-mail, or may forward it to a recipient's computer 690 ("recipient" in this example) over a connection 680 between the mail server 670 and the recipient (which again may be a conventional telephone network connected by means of a modem or may be a high speed connection).

SUMMARY OF THE INVENTION

In accordance with the principles of the invention, a method for sending a facsimile document to a recipient is disclosed. The method comprises: generating an electronic mail message to which the facsimile document is attached, the message having associated therewith an address containing a telephone number of the recipient to which the facsimile document is to be transmitted, and a domain name of a facsimile mail server; forwarding the electronic mail message to the facsimile mail server; determining an IP address of a Gateway whose utilization is lowest to which the electronic mail message is to be forwarded from the facsimile mail server; forwarding the electronic mail message to the IP address of the Gateway selected; and forwarding the facsimile document from the Gateway selected to the recipient.

In one embodiment, the IP address may be selected from a lookup table having utilization data with respect to one or more Gateways in one or more Zones in an H 323 network, which utilization data is obtained from a Gatekeeper associated with the H 323 network. The lookup table may further comprise a Gateway domain name associated with one or more Gateways in one or more Zones in the H 323 network, and an IP address for one or more of the Gateways in one or more of the Zones. The IP address may be selected by choosing a Gateway domain name by reference to the telephone number of the recipient in the electronic mail message address, selecting a Gateway from the Gateways associated with the Gateway domain name chosen, and determining the IP address of the Gateway selected. The Gateway domain name may be chosen by reference to an area code portion and/or an exchange portion of the telephone number of the recipient. The Gatekeeper may be queried periodically for the data. The lookup table may be maintained at the facsimile mail server or at the Gatekeeper. The facsimile document may be forwarded over a conventional telephone network. The electronic mail message may be generated in a computer. The electronic mail message may be forwarded from the computer to a mail server and then from the mail server over an IP network to the facsimile mail server. The facsimile document may be formatted in a format suitable for its transmission as an attachment to an electronic mail message such as a TIF attachment.

In accordance with the principles of the invention, there is further disclosed a method for facilitating the transmission of a facsimile document to a recipient. The method comprises: defining a Gateway domain name for one or more Zones in an H 323 network, each Zone comprising a set of one or more Gateways; obtaining, from a Gatekeeper associated with the H 323 network, utilization data concerning one or more Gateways in one or more of the Zones; and generating a lookup table comprising a Gateway domain name for one or more of the Zones, the utilization data with respect to one or more of the Gateways in the Zones obtained from the Gatekeeper, and an IP address for one or more of the Gateways in the Zones.

The facsimile document may be formatted in a format suitable for its transmission as an attachment to an electronic mail message, such as a TIF attachment. The utilization data may be obtained by querying the Gatekeeper periodically for the data. The Gatekeeper may be queried every minute. The lookup table may be maintained at a facsimile mail server or at the Gatekeeper.

The method disclosed may further comprise: determining, by reference to a telephone number of the recipient in an electronic mail message address, a Gateway domain name associated with a Zone from which the facsimile document will be transmitted over a conventional telephone network to the recipient; and selecting from the lookup table an IP address of a Gateway, from among the set of Gateways in the Zone associated with the Gateway domain name determined, whose utilization is lowest.

The Gateway domain name associated with the Zone from which the facsimile document will be transmitted over the conventional telephone network to the recipient may be determined by reference to an area code portion of the telephone number of the recipient and/or an exchange portion of the telephone number of the recipient.

In accordance with the principles of the invention, there are further disclosed systems for carrying out the above-described steps.

BRIEF DESCRIPTION OF DRAWINGS

The above-mentioned and other features of the invention will now become apparent by reference to the following description taken in connection with the accompanying drawings in which:

FIG. 5 is an illustration of a prior art H 323 Gatekeeper lookup table for a more complicated example where there are three zones, each zone has multiple Gateways, and the table includes utilization data for the Gateways.

FIG. 11 is an illustration of a lookup table maintained by a facsimile mail server to determine Gateway domain names.

FIG. 13 is an illustration of a Gatekeeper lookup table under the H 323 protocol.

DETAILED DESCRIPTION OF THE PREFERRED EMBODIMENT(S)

The embodiments of the invention herein described permit the efficient use of VOIP Gateways to transmit facsimiles which utilize a T 37 protocol.

According to the T 37 protocol for transmitting a facsimile message or document over an IP network, the address of a recipient of a facsimile may be specified by, for example, "1112223333@faxservername.xxx". Digits preceding an "@" sign ("1112223333" in this example) may be treated as a conventional telephone number of the facsimile recipient, while text which follows the "@" sign ("faxservername.xxx" in this example) may be considered to be a name of a facsimile mail server. (Of course, it will be recognized by one of ordinary skill in the art that the recipient telephone number and facsimile mail server may be specified in other formats or that different conventions may be employed to designate where in the address the recipient telephone number and facsimile mail server name are presented without departing from the principles of the invention.)

Figure 1:
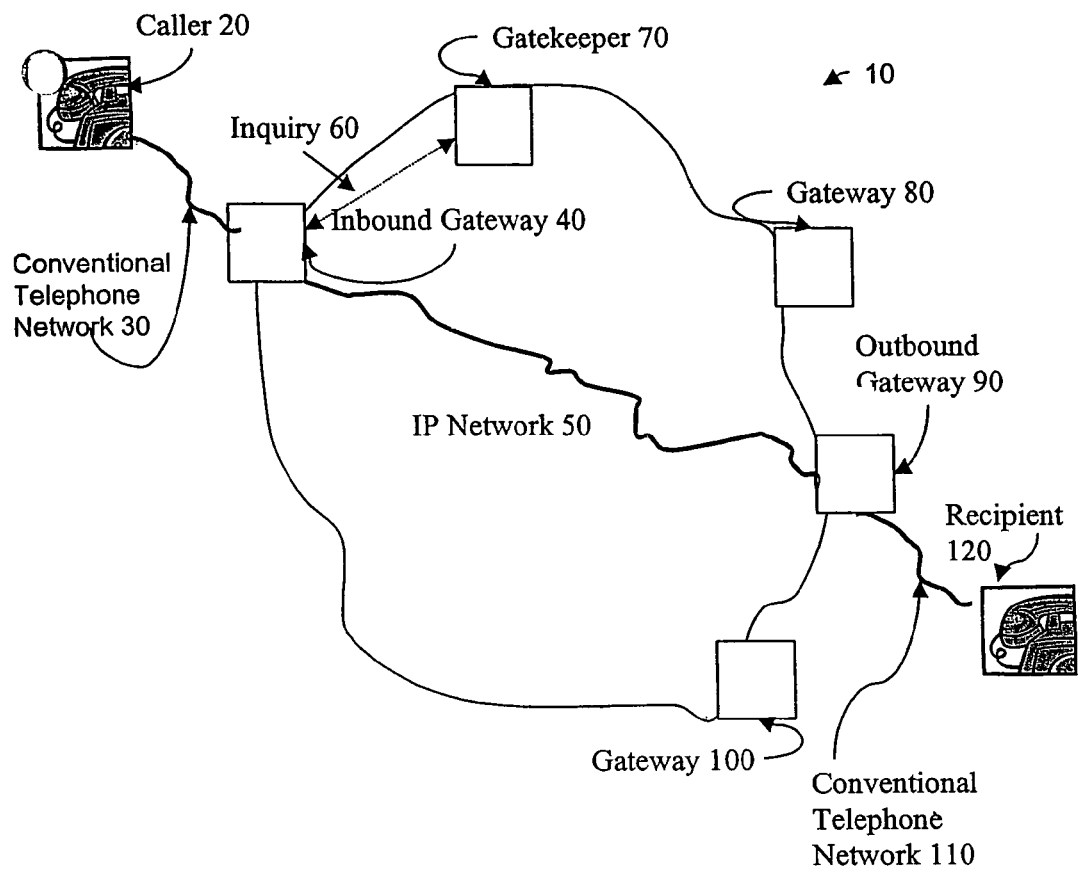
FIG. 1 is an illustration of a prior art method for the transmission of a telephone call over a VOIP network utilizing the H 323 protocol.
Figure 2:
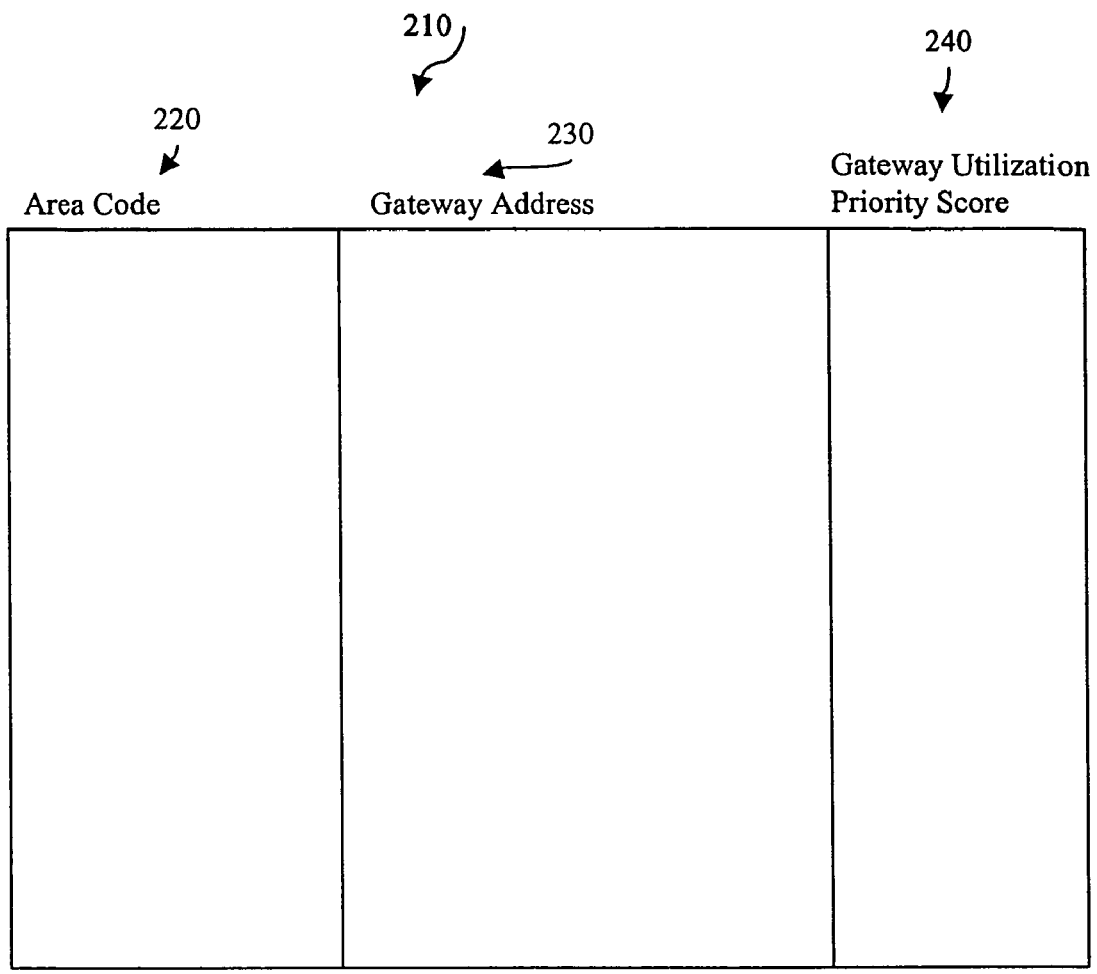
FIG. 2 is an illustration of a prior art structure of an H 323 Gatekeeper lookup table.
Figure 3:
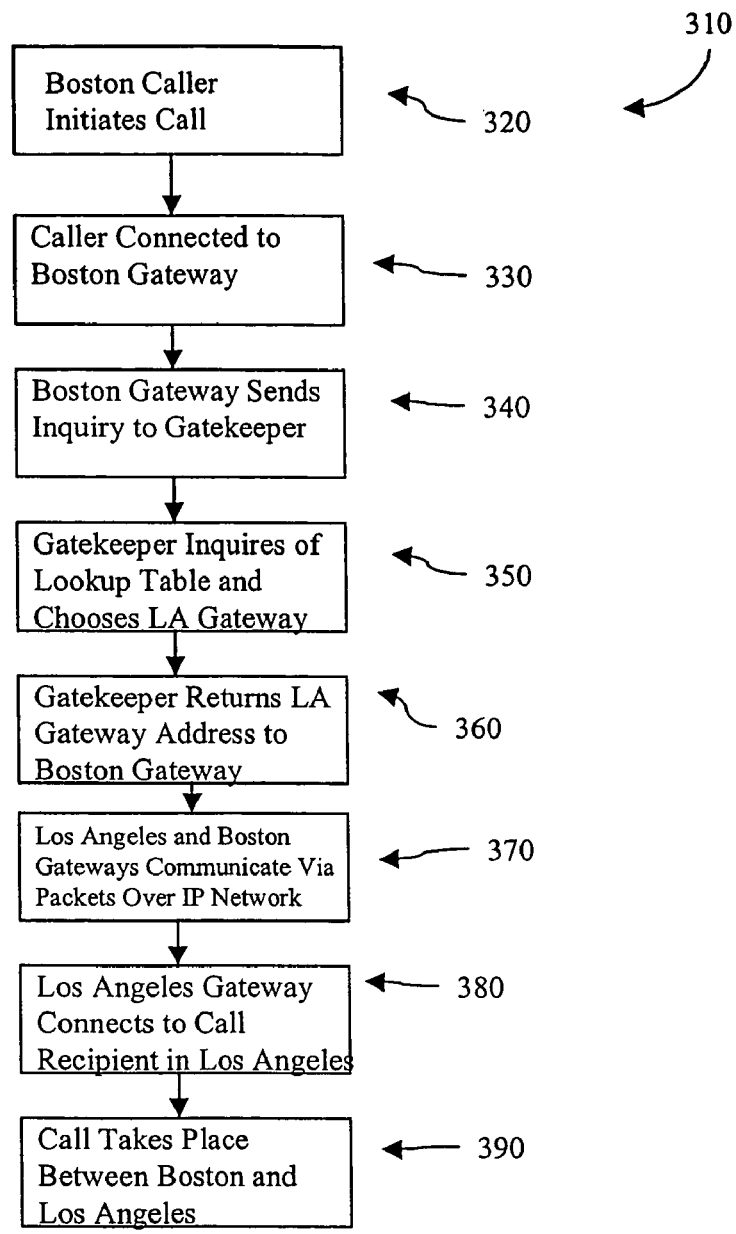
FIG. 3 is a flow chart illustrating a prior art method for the transmission of a telephone call over a VOIP network utilizing the H 323 protocol.
Figure 4:
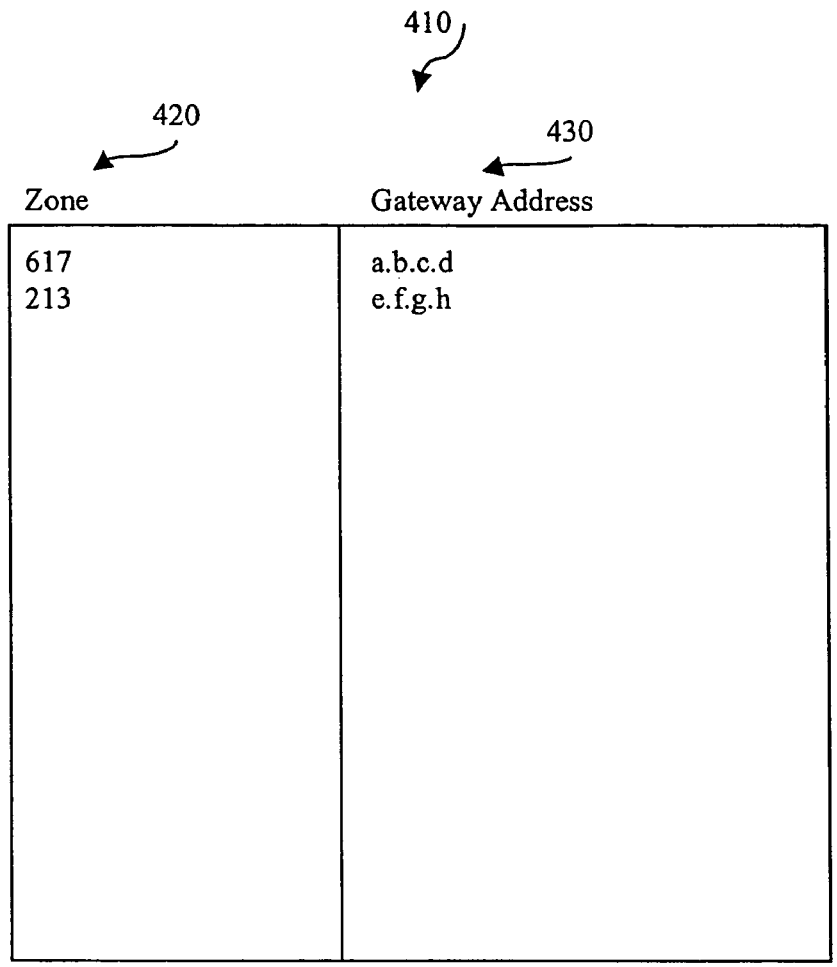
FIG. 4 is an illustration of a prior art H 323 Gatekeeper lookup table for a simple example of a two-zone network where each zone has one Gateway.
Figure 6:
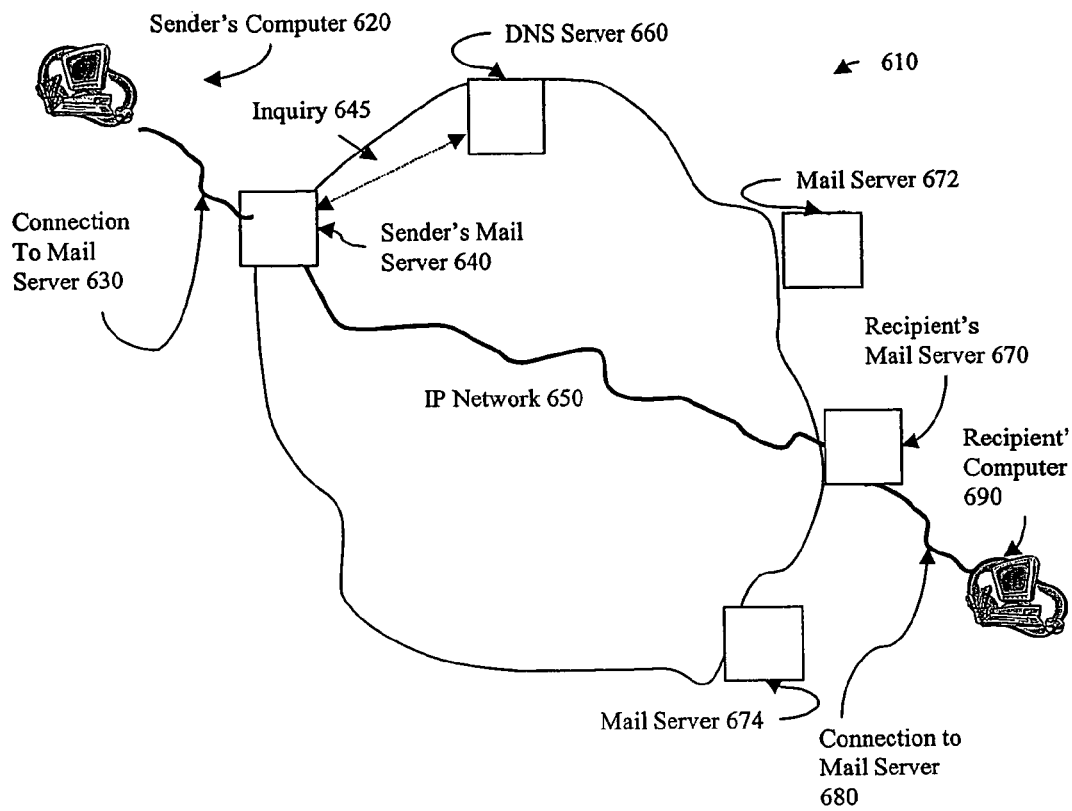
FIG. 6 is an illustration of a prior art method for the transmission of electronic mail over an IP network.
Figure 7:
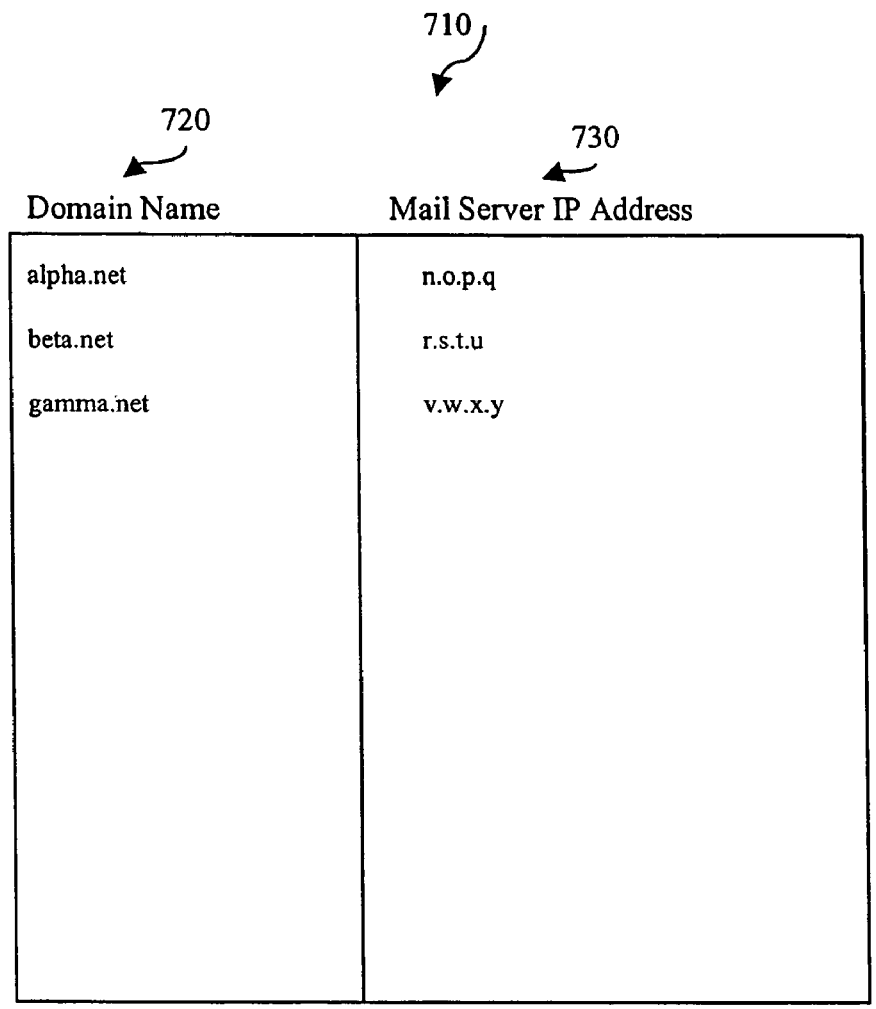
FIG. 7 is an illustration of a prior art DNS server lookup table containing MX records for a simple example where there are three mail servers and each has a single IP address.
Figure 8:
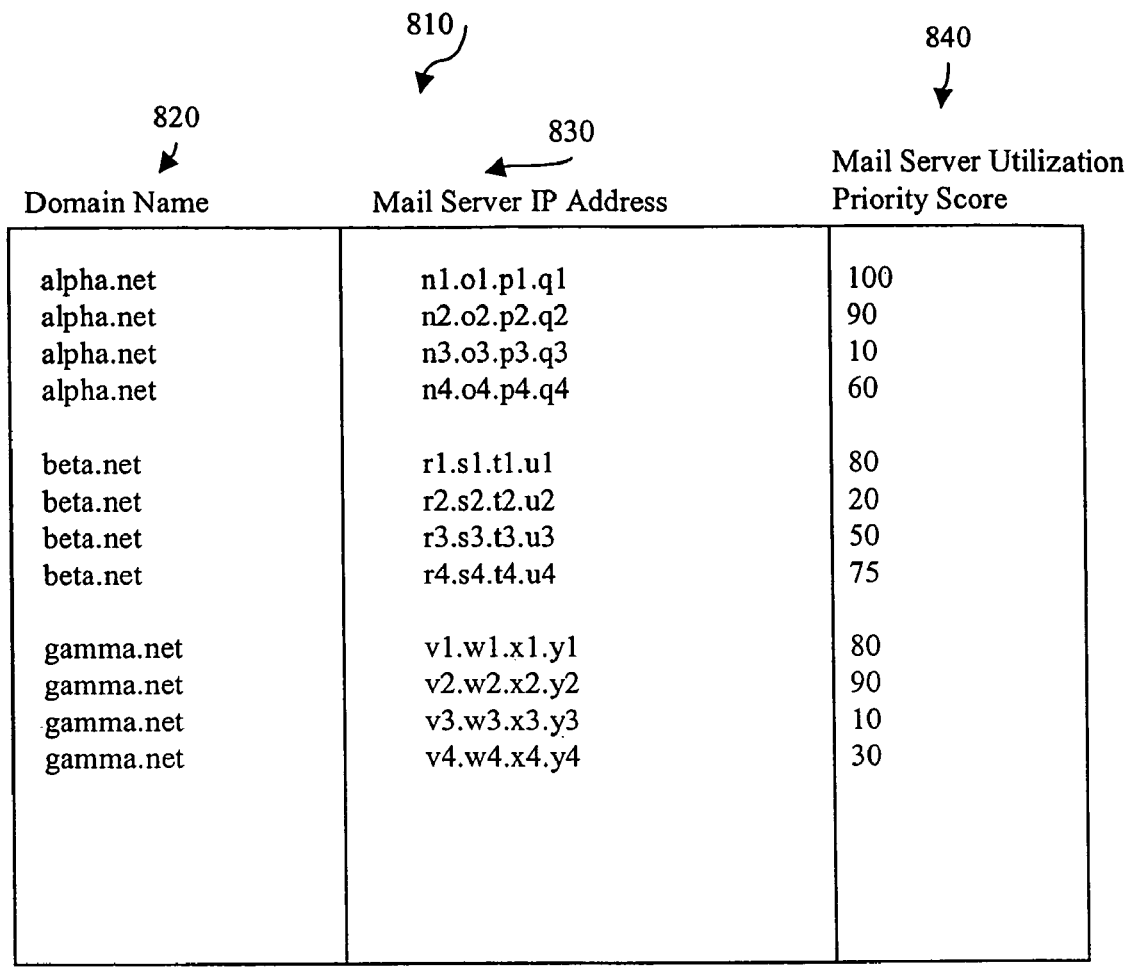
FIG. 8 is an illustration of a prior art DNS server lookup table containing MX records for a more complicated example where there are three mail servers, each has multiple IP addresses, and the table includes utilization data for the IP addresses.
Figure 9:
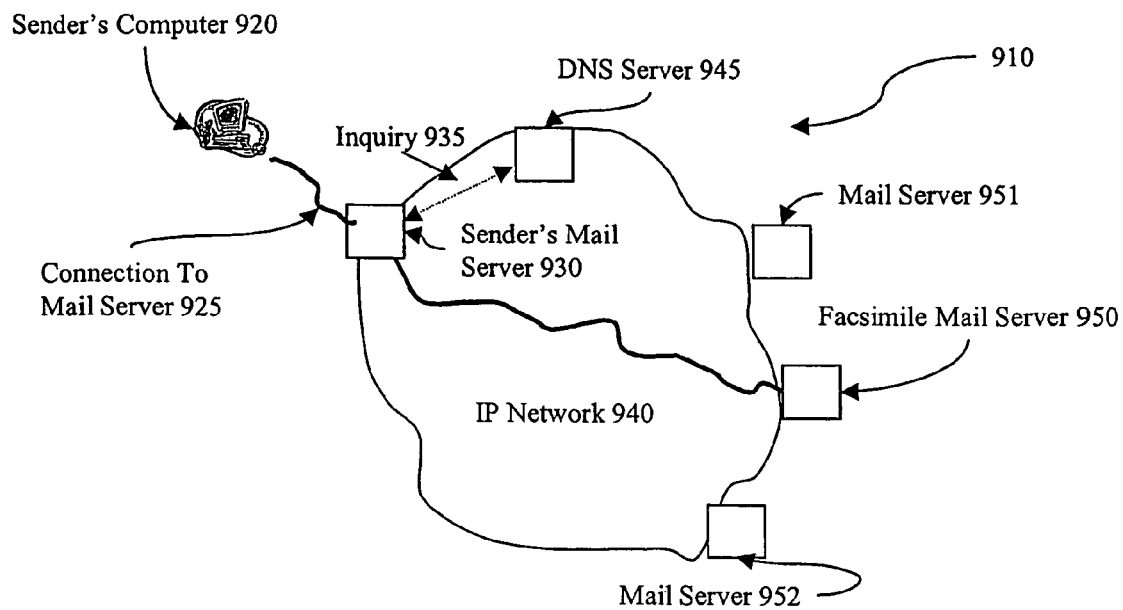
FIG. 9 is an illustration of the transmission of a facsimile document from its origination in a computer to a facsimile mail server.
Figure 10:
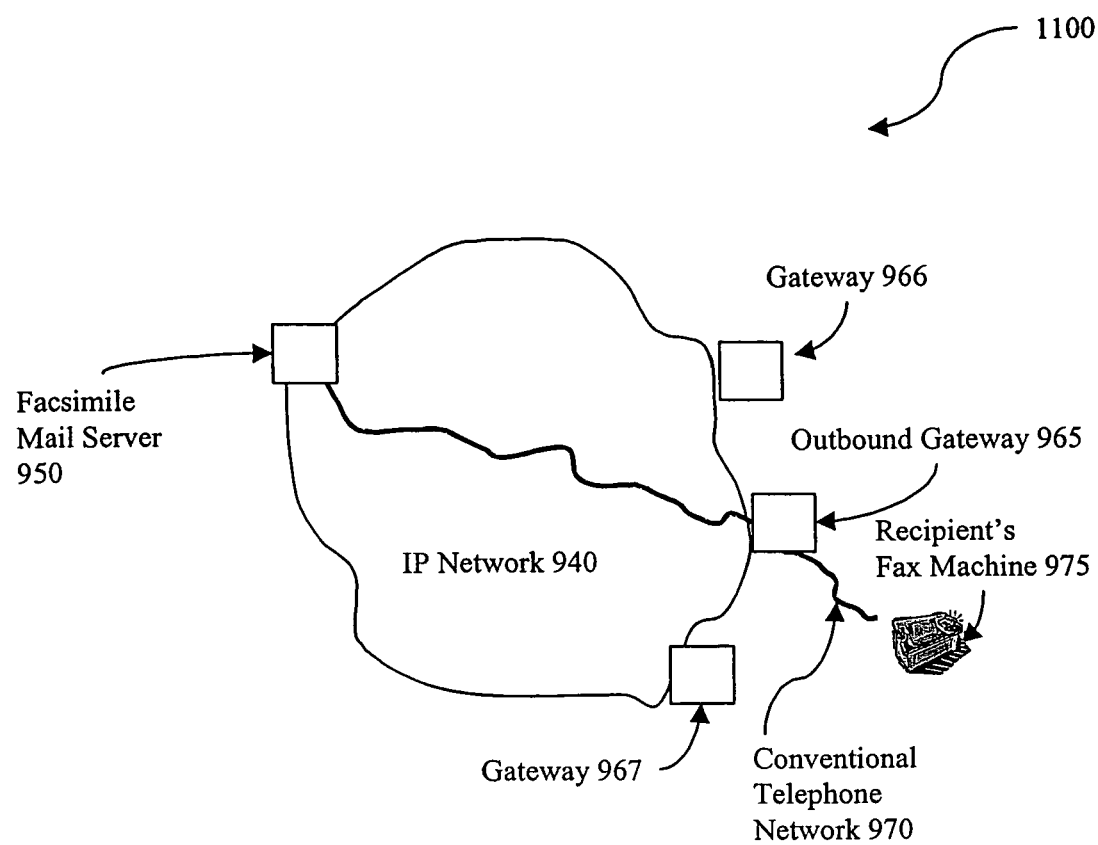
FIG. 10 is an illustration of the transmission of a facsimile document from a facsimile mail server to a recipient.

As illustrated in FIGS. 9 and 10, a process applying the principles of the invention to use the T 37 protocol for sending a facsimile message over an IP network may be considered to comprise two parts: (1) sending the facsimile message or document to a facsimile mail server (FIG. 9); and (2) sending the message from the facsimile mail server to the recipient (FIG. 10). According to the principles of the invention, an initial portion of the process 910, sending the message to the facsimile mail server, is illustrated in FIG. 9. It begins when a sender, wishing to send a facsimile communication to a recipient's facsimile machine, or other device capable of receiving facsimile documents, whose telephone number is "1112223333", sends the facsimile communication as an attachment (such as a TIF attachment) to an E-mail message, where the E-mail message is addressed to "1112223333@faxservername.xxx". That communication may be sent by the sender's computer (or other device) 920 over a connection 925 to his own mail server 930, which then may send an inquiry 935 to a DNS server 945 to provide it with an IP address for the facsimile mail server "faxservername.xxx" 950. (Alternatively, the mail server may obtain the IP address of the facsimile mail server by other means; for example, it may be provided by the sender in or in association with the message to which is attached the facsimile document.) The sender's mail server 930 then may forward the facsimile communication over the IP network 940 to the IP address which represents "faxservername.xxx" 950.

The facsimile mail server "faxservername.xxx" 950 is responsible for handling facsimile traffic in the IP network 940. As illustrated in FIG. 10, when the facsimile mail server 950 gets a facsimile message over the IP network 940, by the process of the invention described above, its task may be to select a VOIP Outbound Gateway 965 to which the facsimile message should be forwarded over the IP network 940, for ultimate delivery over a conventional telephone network 970 to the recipient's facsimile machine or other device capable of receiving facsimile documents 975, and then to forward the facsimile message over the IP network 940 to the VOIP Outbound Gateway 965. selected. (It will be understood by those of ordinary skill in the art that in place of delivering the facsimile message entirely over a conventional land-line telephone network, the message may be delivered through the use of a cellular or other telephone connection over a wireless network. Hereafter, references to conventional telephone networks will be understood to encompass cellular or other wireless systems.)

Advantages of the embodiments of the invention disclosed herein include permitting a facsimile mail server to select an Outbound Gateway based upon the utilization of Gateways.

Previously, an IP address of an Outbound Gateway to be utilized as a "drop off point" for the facsimile message could be chosen by means of a static lookup table maintained, for example, at the facsimile mail server and/or in a conventional DNS server of which inquiry might be made. Thus, previously, the facsimile mail server might first determine a domain name associated with a Gateway through which the facsimile message might be forwarded to a conventional telephone network, and then might determine an IP address for a Gateway in an H 323 Zone associated with the Gateway domain name by calling upon a DNS server which associated Gateway domain names (such as "213.Sigma.net") with Gateway IP addresses in a static manner. (For example, "213.Sigma.net" might be associated with a Gateway IP address "4.5.6.7".)

However, it may be more efficient if a choice of a particular Gateway to be used at any given time is based in part on loads on Gateways. This is because, if a Gateway is busy, the time for delivery of a message may increase, and the risk of error or nondelivery may increase as well.

The principles of the invention permit a dynamic allocation of Gateways to be made, whereby a choice of a Gateway for a particular facsimile message may be based upon loads on different Gateways at a time a particular facsimile message is to be delivered, as well as upon a distance between Gateways and the recipient.

Figure 12:
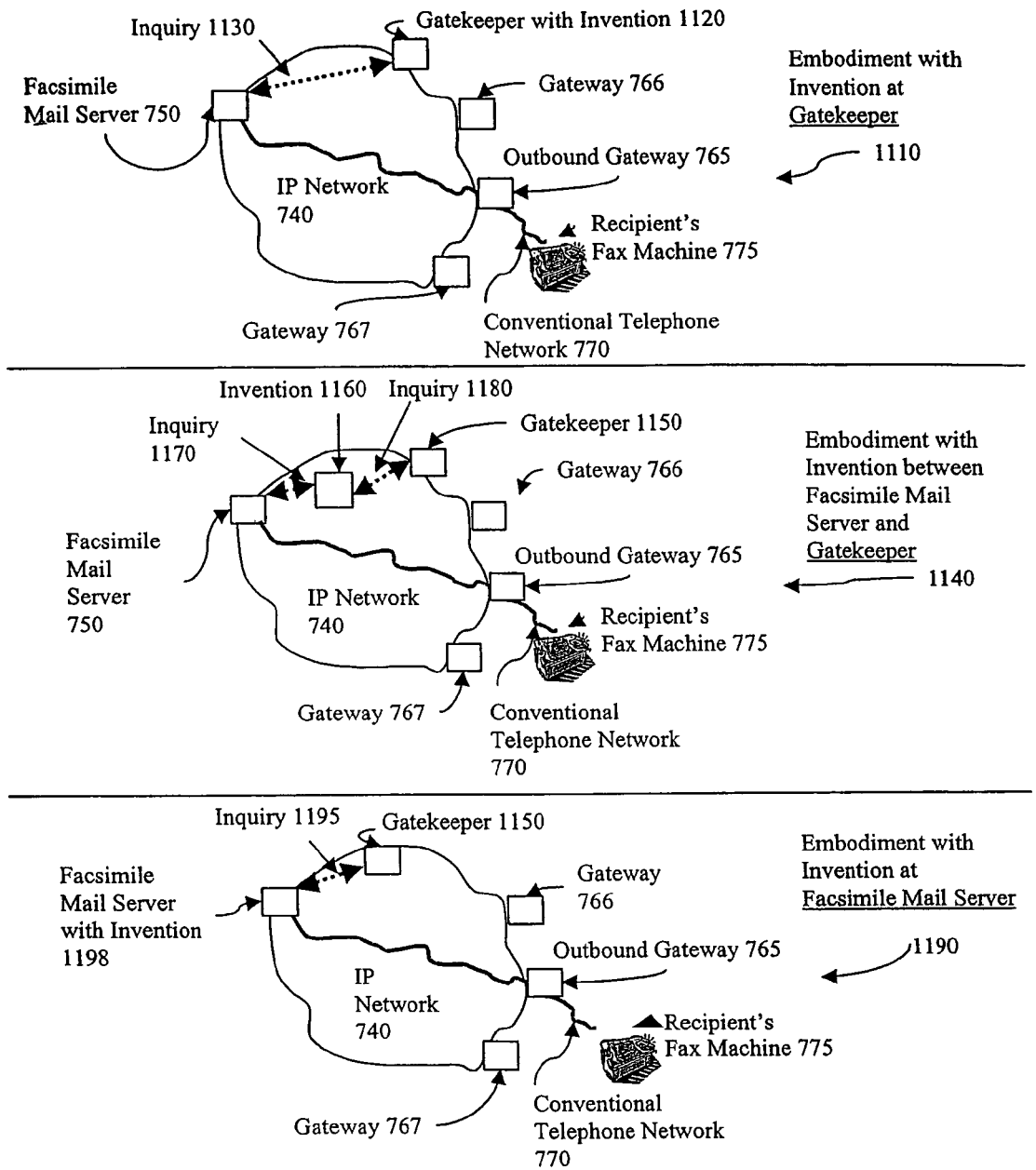
FIG. 12 is an illustration of three embodiments of the invention.

FIG. 12 illustrates various embodiments by which Gateways may be allocated. In one embodiment 1190, a lookup table comprising utilization data may be implemented in association with a facsimile mail server, in another 1110 the lookup table may be implemented in association with a Gatekeeper which a facsimile mail server queries, and in yet another 1140 the lookup table may be implemented in association with a separate device. In the second and third implementations 1110, 1140, a single lookup table incorporating the principles of the invention may service multiple facsimile mail servers.

According to embodiments of the invention, a Gateway may be chosen in a dynamic manner which utilizes H 323 Gatekeeper information about loads upon various Gateways in a relevant H 323 Zone. Referring to FIG. 12, the method 1190 of carrying out the invention in which the lookup table is implemented in association with the facsimile mail server 1198 will now be described.

According to this embodiment of the invention 1190, the process for sending a facsimile message which employs the T 37 protocol over the VOIP network utilizing the H 323 protocol may continue after the facsimile message has been transmitted to the facsimile mail server as shown in FIG. 12.

The process may continue by the facsimile mail server 1198 determining a Gateway domain name (such as "213.Sigma.net") associated with a Zone from which a facsimile message may be forwarded from the IP network to a conventional telephone network. The facsimile mail server may do so by reference to a look up table 1210, as illustrated in FIG. 11, which it maintains or to which it has access. For example, FIG. 11 illustrates a situation where there are three Zones 1220 and thus three Gateway domain names 1230, each one corresponding to an area code. The look up table 1210 might associate a Zone 1220 consisting of an area code "213" with a Gateway domain name 1230 such as "213.Sigma.net". When a facsimile message reaches the facsimile mail server 1198 as illustrated in FIG. 12, that server may determine a Zone by reference to an area code (or area code/exchange combination or telephone number) from an address of the E-mail using the T 37 protocol, may look up the zone for the area code (or area code/exchange combination or telephone number) in its look up table, and may determine a domain name of Gateways associated with the zone.

Once the Gateway domain name has been determined, the next task according to the principles of the invention is determining an IP address for a Gateway associated with the Gateway domain name which is to be used to forward the facsimile message into the conventional telephone network. In FIG. 12, the process 1190 proceeds according to the principles of the invention by the facsimile mail server 1198 looking up the Gateway domain name determined in a table maintained in association with the facsimile mail server and constructed according to the invention, not in a static table. There then may be determined from that table an IP address of a Gateway currently selected by the principles of the invention to be used as the Gateway for a facsimile message directed to a recipient in the Zone associated with that Gateway domain name. The facsimile mail server then may forward the facsimile message over the IP network 740 to the selected Gateway 765, where it may be converted to a facsimile suitable for transmission over a conventional telephone network and forwarded over a conventional telephone network 770 to the recipient's facsimile machine or other device capable of receiving facsimile documents 775.

According to an embodiment of the invention, the look up table associating Gateway domain names with Gateway IP addresses may be constructed and utilized as follows. A unique Gateway domain name may be defined for each H 323 Zone. (For example, in conformity with the illustrative example set forth in FIG. 11, a Gateway name "213.Sigma.net" may be defined for H 323 Zone 213, a name "617.Sigma.net" may be defined for H 323 Zone 617, and a name "919.Sigma.net" may be defined for H 323 Zone 919.) From time to time, the H 323 Gatekeeper 1150 as shown in FIG. 12 may be queried 1195 for information about Gateways 765, 766, 767. (For example, this may be done every minute.)

FIG. 13 illustrates an example wherein when a query 1195 to the Gatekeeper 1150 takes place the Gatekeeper lookup table 1400 has the following information for the H 323 Zone "213": Gateway "GW LA 1" has a utilization of 80, Gateway "GW LA 2" has a utilization of 90, Gateway "GW LA 3" has a utilization of 10, and Gateway "GW LA 4" has a utilization of 30. At the same time, similar utilization information for Gateways in 617 and 919 Zones is being maintained in the H 323 Zone lookup table 1400. (Of course, in actual practice Gateways may be identified according to the IP protocol in the form "a.b.c.d", not by alphanumeric names such as "GW LA 1".)

Figure 14:
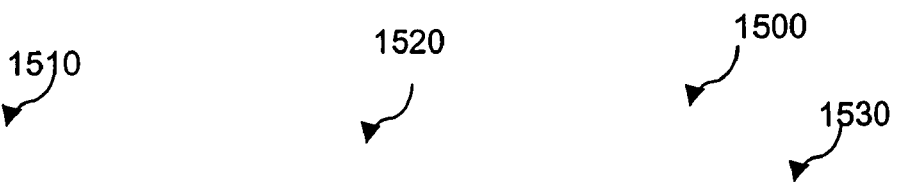
FIG. 14 is an illustration of a lookup table maintained at a facsimile mail server, in one embodiment of the invention, containing data with respect to the IP address and utilization of each Gateway associated with each Gateway domain name.

Under the example illustrated in FIG. 12, and referring to the lookup table 1400 in FIG. 13, when the query 1195 to the Gatekeeper 1150 takes place there may be returned from the Gatekeeper 1150, for every H 323 Zone, utilization data 1430 with respect to every Gateway 1420 for the Zone 1410, and accordingly the facsimile mail server may construct a lookup table 1500 as illustrated in FIG. 14. The lookup table 1500 constructed may contain, for the zone associated with the Gateway domain name "213.Sigma.net" four entries, corresponding to the four H 323 Gateways in the 213 Zone: LA 1, LA 2, LA 3, and LA 4. In this illustrative example, the entries 1520 are identified as "LA1.Sigma.net", "LA2.Sigma.net", "LA3.Sigma.net", and "LA4.Sigma.net". Each entry 1520 may have associated with it corresponding utilization data 1530 for an equivalent H 323 Gateway: 80, 90, 10 and 40, respectively, in the example from FIG. 13. (Again, of course, in actual practice Gateways may be identified according to the IP protocol in the form "a.b.c.d", not by alphanumeric names such as "LA1.Sigma.net".)

According to an embodiment of the invention, then, and referring to FIG. 12, when a facsimile message reaches the facsimile mail server 1198, the process may proceed as follows. The facsimile mail server 1198 may determine from an area code (or area code/exchange combination or full telephone number) portion of an address associated with the facsimile message an appropriate Gateway domain name (corresponding to an H 323 Zone in which a recipient falls). A lookup table as illustrated in FIG. 14 constructed according to the principles of the invention may then be queried, and an actual Gateway address, associated with the Gateway domain name, which has a lowest utilization at the time may then be chosen. According to the invention, the facsimile message may then be forwarded to the IP address associated with the Gateway chosen 765, where it may be converted to a format appropriate for transmittal over a conventional telephone network 770, and forwarded to the recipient's facsimile machine or other device capable of receiving facsimile documents 775 over a conventional telephone network 770.

This example has illustrated the working of the invention in a case where it is implemented by maintaining the lookup table in association with the facsimile mail server itself. It will be understood however that the invention can equally be implemented in an embodiment 1110 (see FIG. 12) wherein the table of FIG. 14 is maintained in association with the Gatekeeper 1120. In that circumstance, the Gatekeeper 1120 may construct the lookup table containing utilization (priority) data for each Gateway address associated with each Gateway domain name, and when the facsimile server 750 inquires of it for the Gateway address to which to forward a facsimile with a telephone number associated with Gateway domain name "213.Sigma.net" the Gatekeeper may look in the lookup table (see FIG. 14) and choose the Gateway address associated with that Gateway domain name that has the lowest usage (in this example, Gateway address "LA3.Sigma.net".

The invention also can be implemented in an embodiment 1140 (see FIG. 12) wherein the invention's lookup table associating Gateway domain names, Gateway addresses, and utilization (priority) information (see FIG. 14) is maintained in association with an entity 1160 independent of both the facsimile mail server 750 and the Gatekeeper 1150. In this embodiment 1140, the entity 1160 maintaining the lookup table periodically may inquire of the Gatekeeper 1150 in order to obtain the necessary utilization data, and when the facsimile mail server 750 needs to forward a facsimile message it in turn may inquire of that entity 1160 to obtain the Gateway address of the Gateway 765 associated with the appropriate Gateway domain name which has the lowest utilization.

What is claimed is:

1. A method for facilitating the transmission of a facsimile document to a recipient, the method comprising:
   a. utilizing a computer for electronically defining a Gateway domain name for one or more Zones in an H 323 network, each Zone comprising a set of one or more Gateways;
   b. obtaining by utilizing the computer, from a Gatekeeper associated with the H 323 network, utilization data concerning one or more Gateways in one or more of the Zones; and
   c. generating a lookup table by utilizing the computer, the lookup table electronically stored on a computer and comprising a Gateway domain name for one or more of the Zones, the utilization data with respect to one or more of the Gateways in the Zones obtained from the Gatekeeper, and an IP address for one or more of the Gateways in the Zones.

2. The method of claim 1, further comprising formatting the facsimile document in a format suitable for transmission as an attachment to an electronic mail message.

3. The method of claim 2, wherein formatting includes formatting the facsimile document as a TIF attachment.

4. The method of claim 1, wherein obtaining the utilization data includes querying the Gatekeeper periodically for the data.

5. The method of claim 4, wherein querying the Gatekeeper includes querying every minute.

6. The method of claim 1, wherein the lookup table is maintained at a facsimile mail server.

7. The method of claim 1, wherein the lookup table is maintained at the Gatekeeper.

8. The method of claim 1, further comprising:
   a. determining, by reference to a telephone number of the recipient in an electronic mail message address, a Gateway domain name associated with a Zone from which the facsimile document will be transmitted over a conventional telephone network to the recipient; and
   b. selecting from the lookup table an IP address of a Gateway, from among the set of Gateways in the Zone associated with the Gateway domain name determined, whose utilization is lowest.

9. The method of claim 8, wherein determining the Gateway domain name associated with the Zone from which the facsimile document will be transmitted over the conventional telephone network to the recipient includes determining the name by reference to an area code portion of the telephone number of the recipient.

10. The method of claim 8, wherein determining the Gateway domain name associated with the Zone from which the facsimile document will be transmitted over the conventional telephone network to the recipient includes determining the name by reference to an area code portion of the telephone number of the recipient for some area codes, and to a combination of an area code portion and an exchange portion of the telephone number of the recipient for other area codes.

11. The method of claim 8, wherein determining the Gateway domain name associated with the Zone from which the facsimile document will be transmitted over the conventional telephone network to the recipient includes determining the name by reference to an area code portion and an exchange portion of the telephone number of the recipient.

12. A computing system comprising at least one computing device configured to:
   a. generate a Gateway domain name for one or more Zones in an H 323 network, each Zone comprising a set of one or more Gateways;
   b. obtain, from a Gatekeeper associated with the H 323 network, utilization data concerning one or more Gateways in one or more of the Zones; and
   c. generate a lookup table comprising a Gateway domain name for one or more of the Zones, the utilization data with respect to one or more of the Gateways in the Zones obtained from the Gatekeeper, and an IP address for one or more of the Gateways in the Zones.

13. The computing system of claim 12, further configured to format the facsimile document in a format suitable for its transmission as an attachment to an electronic mail message.

14. The computing system of claim 13, further configured to format the facsimile document as a TIF attachment.

15. The computing system of claim 12, further configured to query the Gatekeeper periodically for the data.

16. The computing system of claim 15, further configured to query the Gatekeeper every minute.

17. The computing system of claim 12, further configured to maintain the lookup table at a facsimile mail server.

18. The computing system of claim 12, further configured to maintain the lookup table at the Gatekeeper.

19. The computing system of claim 12, further configured to:
   a. determine, by reference to a telephone number of the recipient in an electronic mail message address, a Gateway domain name associated with a Zone from which the facsimile document will be transmitted over a conventional telephone network to the recipient; and
   b. select from the lookup table an IP address of a Gateway, from among the set of Gateways in the Zone associated with the Gateway domain name determined, whose utilization is lowest.

20. The computing system of claim 19, further configured to determine the name by reference to an area code portion of the telephone number of the recipient.

21. The computing system of claim 19, further configured to determine the name by reference to an area code portion of the telephone number of the recipient for some area codes, and to a combination of an area code portion and an exchange portion of the telephone number of the recipient for other area codes.

22. The computing system of claim 19, further configured to determine the name by reference to an area code portion and an exchange portion of the telephone number of the recipient.

* * * * *